US012687479B2

(12) United States Patent
Moix Olivé

(10) Patent No.: US 12,687,479 B2
(45) Date of Patent: Jul. 21, 2026

(54) ASPIRATING SMOKE DETECTION UNIT FOR REDUCING ENVIRONMENTAL ELECTROSTATIC CHARGE AND THE SPREAD OF AIRBORNE CONTAMINANTS

(71) Applicant: Carrier Corporation, Palm Beach Gardens, FL (US)

(72) Inventor: Pere Moix Olivé, Barcelona (ES)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 921 days.

(21) Appl. No.: 17/738,465

(22) Filed: May 6, 2022

(65) Prior Publication Data

US 2022/0357263 A1     Nov. 10, 2022

(30) Foreign Application Priority Data

May 6, 2021    (EP) ..................................... 21382406

(51) Int. Cl.
| | |
|---|---|
| *G01N 15/06* | (2024.01) |
| *C01B 13/10* | (2006.01) |
| *G01N 1/24* | (2006.01) |
| *G01N 15/00* | (2024.01) |
| *G01N 15/075* | (2024.01) |

(52) U.S. Cl.
CPC ............. *G01N 15/06* (2013.01); *C01B 13/10* (2013.01); *G01N 1/24* (2013.01); *G01N 2001/245* (2013.01); *G01N 2015/0046* (2013.01); *G01N 15/075* (2024.01)

(58) Field of Classification Search
CPC ........ G01N 15/06; G01N 1/24; G01N 15/075; G01N 2001/245; G01N 2015/0046; C01B 13/10; A61L 9/22; A61L 2209/111; A61L 2209/212; A61L 9/015; G08B 17/10; G08B 17/11; B01D 53/76; B01D 2251/104; B03C 3/017
See application file for complete search history.

(56) References Cited

U.S. PATENT DOCUMENTS

| | | |
|---|---|---|
| 6,174,500 B1 | 1/2001 | Uno et al. |
| 9,518,487 B2 | 12/2016 | Coelho Ferreira |
| | (Continued) | |

FOREIGN PATENT DOCUMENTS

| | | | | |
|---|---|---|---|---|
| CN | 104075377 A | 10/2014 | | |
| CN | 104613546 A | * 5/2015 | .............. | F24F 8/158 |
| | (Continued) | | | |

OTHER PUBLICATIONS

European Search Report for Application No. 21382406.3; Issued Nov. 2, 2021; 9 Pages.

*Primary Examiner* — Robert H Kim
(74) *Attorney, Agent, or Firm* — CANTOR COLBURN LLP

(57) ABSTRACT

An aspirating smoke detection unit 1 for limiting the spread of airborne contaminants. The aspirating smoke detection unit 1 includes a smoke detector 5 for detecting the presence of smoke particles suspended in air from a monitored region; an ozone generator 7 for producing ozone from oxygen contained in air from the monitored region 20; and an ionizer 8 for ionizing air molecules within air from the monitored region 20. A methods of reducing the spread of airborne contaminants within a monitored region 20 using the aspirating smoke detection unit 1.

13 Claims, 2 Drawing Sheets

(56) References Cited

U.S. PATENT DOCUMENTS

| | | | |
|---|---|---|---|
| 9,993,828 | B2 | 6/2018 | Ajay et al. |
| 2006/0125648 | A1 | 6/2006 | Young |

FOREIGN PATENT DOCUMENTS

| | | | |
|---|---|---|---|
| CN | 204880418 | U | 12/2015 |
| CN | 206420061 | U | 8/2017 |
| CN | 110360653 | A | 10/2019 |
| EP | 0826199 | A1 | 3/1998 |
| FR | 2689399 | A1 | 10/1993 |
| JP | 2006175008 | A | 7/2006 |
| JP | 2012105707 | A | 6/2012 |
| WO | 2002068874 | A1 | 9/2002 |

* cited by examiner

ASPIRATING SMOKE DETECTION UNIT FOR REDUCING ENVIRONMENTAL ELECTROSTATIC CHARGE AND THE SPREAD OF AIRBORNE CONTAMINANTS

FOREIGN PRIORITY

This application claims priority to European Patent Application No. 21382406.3, filed May 6, 2021, and all the benefits accruing therefrom under 35 U.S.C. § 119, the contents of which in its entirety are herein incorporated by reference.

TECHNICAL FIELD OF INVENTION

The present invention relates to an aspirating smoke detection unit, as well as a method of reducing the spread of airborne contaminants using an aspirating smoke detection unit.

BACKGROUND OF THE INVENTION

Aspirating smoke detection systems are a known type of fire detection means. These systems include a central aspirating smoke detection unit that is arranged to draw air into the system from a region to be monitored, often having one or more fans to draw the air into the system and move it towards the central detection unit. The central smoke detection unit is typically connected to a series of sampling pipes having a plurality of inlets arranged along their length to allow air to be drawn into the system from a number of locations remote from the central smoke detection unit. The central smoke detection unit comprises a highly sensitive smoke detector for detecting the presence of smoke particles suspended within the air, indicating the presence of a fire somewhere within the monitored region. After the air has been passed through the smoke detector it is exhausted from the system, often back into the region being monitored.

Aspirating detection systems may also be implemented for other detection purposes, for example to determine the presence of airborne particulates or gases. For instance, aspirating detection systems may be configured to detect natural gas which may indicate a gas leak, or to detect carbon monoxide for safety purposes.

Since aspirating detection systems rely on the movement of air, they can lead to the spread of airborne contaminants, such as dust, pollen, mould spores and pathogens, e.g. bacteria, fungi and viruses. This effect may be exacerbated, for instance, when a single aspirating smoke detection system is used for detecting smoke at a number of different locations (e.g. rooms) in a monitored region. In such a system, the air from the different locations within the monitored region may be mixed together within the aspirating smoke detection system before being exhausted back into the locations, allowing contaminants from one location to be spread across all of the locations monitored by the aspirating smoke detection system.

Particulate contaminants, such as dust and pollen, entrained in the air exhausted from aspirating smoke detection systems can also become attracted to surfaces on which electrostatic charge has built up. The airborne particles exhausted from the aspirating smoke detection system can be attracted to the charged surfaces by electrostatic attraction. This can be a particular problem where the air is exhausted into a cleanroom, e.g. in a manufacturing facility, where it is desired to avoid contamination. Electrostatic attraction can also be an issue where insulators and/or isolated (i.e. non-grounded) conductors are present, and built-up static charge cannot be removed from the objects by other means, e.g. by grounding.

Known aspirating smoke detection systems may utilise foam, or HEPA filters to remove dust and other particulate contaminants from the air. Other known systems, such as that disclosed in U.S. Pat. No. 9,993,828, may employ electrically charged surfaces so that the air flowing through the system undergoes electrostatic precipitation so that larger particles are attracted out of the air flow via electrostatic attraction. However, small contaminants may be unaffected by these methods, and may remain within the air that is passed from the aspirating smoke detection system and back into the monitored region.

SUMMARY OF THE INVENTION

In a first aspect, the present invention may provide an aspirating smoke detection unit for limiting the spread of airborne contaminants, comprising: a smoke detector for detecting the presence of smoke particles suspended in air from a monitored region; an ozone generator for producing ozone from oxygen contained in air from the monitored region; and an ionizer for ionizing air molecules in air from the monitored region.

Through the provision of an ozone generator and an ionizer, the aspirating smoke detection unit of the present invention can be used to remove and/or neutralise contaminants suspended in air. "Contaminants" is used herein to refer to particulate contaminants (such as dust, pollen, dander and smoke particles), microbial organisms (such as fungal spores, bacteria and other cellular pathogens) and acellular pathogens (such as viruses).

Ozone produced by the ozone generator can be used to kill or neutralise airborne pathogens, such as viruses and bacteria. Ozone, as a strong oxidant gas, acts to oxidise chemicals it comes into contact with and is a powerful disinfectant. When cellular pathogens, such as bacteria, come into contact with ozone, the ozone acts to oxidise the cellular membrane of the pathogen which causes the cell membrane to rupture. This causes the cell to disintegrate and fall apart, killing the cellular pathogen. The rupture in the cell membrane also allows the ozone to oxidise the cellular components held within the call membrane, such as enzymes, proteins, deoxyribonucleic acid (DNA) and ribonucleic acid (RNA).

Ozone also acts to neutralise acellular pathogens, such as viruses. When viruses come into contact with ozone, the ozone reacts with the protein coat of the virus, alters its three-dimensional structure and prevents the virus from being able to anchor itself to host cells. Hence, ozone can be used to neutralise a virus' ability to infect host cells.

Ozone has also been found to eliminate odours from air. Hence, the ozone produced by the ozone generator may enhance the smell of the air by removing foul and/or stale odours from the air.

Ions (i.e. charged particles, atoms or molecules) produced by the ionizer can also aid in removing contaminants from the air. The ions can be attracted to contaminants suspended in the air, giving the contaminants an overall electric charge. These charged contaminants may then be attracted to grounded conductors, preventing further spread of the contaminants through the air. These contaminants may be the cause of odour. Hence, the production of ions in the aspirating smoke detection unit may also help to reduce or remove odours from the air.

It will therefore be appreciated that the aspirating smoke detection unit can be used to reduce or prevent airborne transmission of contaminants, which may help to reduce or prevent the spread of disease and contamination by airborne particles. These benefits can be achieved through the use of the aspiration smoke detection unit alone, without the need for additional specialised air purification modules or the like.

The aspirating smoke detection unit can also aid in reducing the spread of airborne contaminants without the need to introduce additional filtering material or filtering layers, such HEPA filters, into the path of the air in aspirating smoke detection unit. Hence, this avoids the need to periodically replace or clean the filters if and when the filters become dirty or clogged, or if their performance otherwise degrades. The flow of air through the aspirating smoke detection unit is also not impeded, slowed or otherwise affected by the presence of additional filtering material.

The aspirating smoke detection unit may include one or more aspirators for drawing air into the aspirating smoke detection unit and moving air through the unit. For instance, the aspirating smoke detection unit may include one or more blowers and/or fans. The aspirators may be configured to, in use, draw air into the aspirating smoke detection unit from the monitored region and pass the air between the smoke detector, ozone generator and the ionizer.

The aspirating smoke detection unit is preferably arranged such that ions (i.e. charged air molecules) produced by the ionizer are expelled from the aspirating smoke detection unit. This may be achieved by producing a sufficient amount or concentration of ions at the ionizer so that at least some of the ions remain suspended within the air as the air is expelled from the aspiration smoke detection unit. The ionizer may be configured to generate an initial ion density of at least 600,000 ions/cm$^3$, preferably at least $20\times10^6$ ions/cm$^3$. Whilst the density of the ions may change and decrease as the air moves and is exhausted from the aspirating smoke detection unit, the initial ion density refers to the ion density in the vicinity of the ionizer (e.g. within 200 mm of the ionizer).

Ions expelled from the aspirating smoke detection unit may be attracted to objects with an overall electrical charge that is opposite to the charge of the ion. For instance, a negative ion will be attracted to a positively charged object. This attraction can be used to reduce or eliminate charge, such as static charge, that has built-up on the object. This can be particularly useful for removing static charge that has built up on insulators and intentionally isolated conductors, which may be common in electronics manufacturing, where it is difficult or not possible to remove charge from objects by other means (e.g. by grounding the object). By reducing and/or removing charge that has built up on an object, electrostatic discharge from the object (which may cause sparks or damage the object) can be avoided. Hence, the aspirating smoke detection unit can also be used as a means of electrostatic discharge control.

Using the ions expelled from the aspirating smoke detection unit to reduce and/or remove charge built-up on objects may also help to prevent contamination of electrically charged objects by electrostatic attraction, which may otherwise cause contaminants suspended in the air to become attracted to the charged objects.

The aspirating smoke detection unit may include an inlet through which air may be drawn into the aspirating smoke detection unit. The aspirating smoke detection unit may include an outlet through which air may be expelled from the aspirating smoke detection unit. The one or more aspirators may be configured to, in use, draw air into the aspirating smoke detection unit via the inlet and expel air from the unit via the outlet. The inlet and outlet are preferably separate from one another.

The smoke detector, ozone generator and ionizer are preferably arranged in an air flow circuit (also called an air flow path) such that air drawn into the aspirating smoke detection unit (e.g. via operation of the aspirator(s)) is supplied to each of the smoke detector, ozone generator and ionizer in turn. The one or more aspirators are preferably configured to, in use, draw air into the aspirating smoke detection unit and move air through the air flow circuit. The smoke detector, ozone generator and ionizer may be arranged in any order in the air flow path such that the air may be passed to each of the smoke detector, ozone generator and ionizer in any order. The ozone generator may be arranged upstream of the ionizer, such that the ionizer receives air output from the ozone generator. Alternatively, the ionizer may be arranged upstream of the ozone generator, such that the ozone generator receives air output from the ionizer.

One or more or all of the one or more aspirators may be positioned upstream and/or downstream of the smoke detector.

Preferably, the ionizer and/or the ozone generator are positioned downstream of the smoke detector. That is, air drawn into the aspirating smoke detection unit (e.g. through action of the aspirator(s)) may be received by the smoke detector before being received by or acted on by the ozone generator and/or the ionizer (and/or the aspirator(s)). Whilst it is possible for the smoke detector to detect the presence of smoke particles in the air even if the air received at the smoke detector is turbulent, it is preferred that the air flow at the smoke detector is laminar. Turbulent air may include regions with a high concentration of particles suspended in the air and regions where there are relatively low concentration of particles suspended in the air. This may be caused by turbulent mixing. As a result, if turbulent air is received at the detector, the air may not be fully representative of the concentration of particles within the air in the monitored region. This may affect the accuracy of the smoke detector, and could lead to false indications that a fire is present in the monitored region and/or could result in the smoke detector failing to detect a fire when a fire is present within the monitored region. If the air at the detector is laminar, there may be less variation in the concentration of particles suspended within the air, compared a turbulent airflow, and the accuracy and sensitivity of the smoke detector can be improved. By positioning the ozone generator and/or ionizer (and/or the aspirator(s)) downstream of the smoke detector, disruption of the airflow upstream of the smoke detector can be reduced and/or minimized, and the ability of the aspirating smoke detection unit to detect smoke particles will be unimpeded.

In other arrangements, the ozone generator and/or the ionizer may be positioned upstream of the smoke detector. In this case, the distance a sample of air has to travel between the ozone generator and/or the ionizer (and/or the aspirator(s)) upstream of the smoke detector to the smoke detector is preferably such that the air flow is laminar when it reaches the smoke detector. For instance, the distance a sample of air must travel between the ozone generator and/or the ionizer (and/or the aspirator(s)) to the smoke detector may be greater than 50 mm, or greater than 100 mm. As discussed above, if the air is turbulent at the smoke detector, the sensitivity of the smoke detector to the presence of smoke particles suspended in the air may be altered.

The aspirating smoke detection unit may comprise a controller. The controller may comprise a processor. The controller may be configured to control operation of the smoke detector, aspirator(s), ozone generator and/or the ionizer. For instance, the controller may be configured to intermittently operate the ozone generator and/or ionizer. This may improve efficiency of the unit. For example, the controller may be configured to operate the ozone generator and/or the ionizer (continuously) for predetermined periods of time separated by intervals of non-operation. The intervals of non-operation may be at least 30 seconds, or at least 1 minute. The predetermined periods of time during which the ozone generator and/or the ionizer may be (continuously) operated may be periods of 5 minutes or more, or 10 minutes or more.

The controller may be configured to cause operation of one of the ozone generator and the ionizer independently of the other of the ozone generator and the ionizer. The controller may be configured to cause simultaneous operation the ozone generator and the ionizer. The controller may be configured to receive data and to analyse the data to determine whether to operate one or both of the ozone generator and the ionizer at a given time. The data received by the controller may be representative of factors such as system performance, available power, time of day and/or a detected concentration of airborne contaminants in the air.

The controller may be configured to cause operation of the ozone generator and/or ionizer only when one or more of the aspirators is in operation. In this way, the ozone generator and/or ionizer may only have an effect on the air when air is being actively aspirated (i.e. passed) through the aspirating smoke detection unit, when the spread of contaminants may be more prevalent.

The controller may be arranged to receive data collected by the smoke detector. The controller may be arranged to analyse the data from the smoke detector and determine whether the data is indicative of a fire being present. The controller may be arranged to raise an alarm (i.e. output information indicating that a fire may be present in the monitored region, such as an audible and/or visual alarm) if the data is indicative of a fire being present in the monitored region. For instance, the controller may trigger an alarm if the concentration of smoke particles suspended in the air measured by the smoke detector is above a predetermined threshold value.

The smoke detector may comprise an optical smoke detector, such as a laser detection system or a nephelometer. For instance, the smoke detector may include a laser head.

The ionizer may be configured to produce ions by electrical means. The ionizer may comprise an electrode. The provision of a high voltage to the electrode may cause ionization of air passing the electrode.

The ionizer may be arranged to provide air molecules with a net negative electrical charge. That is, the ionizer may be arranged to generate negative ions (i.e. anions).

The ozone generator may comprise a corona discharge reactor cell, and/or a UV ozone generator.

The ozone generator may be configured to produce ozone at a rate of 2.5 mg/h to 6.0 mg/h, preferably at a rate of 2.0 mg/h to 3.0 mg/h.

The aspirating smoke detection unit may comprise an electrical connection point for connecting to an external power supply, such as a mains electricity supply in a building. The aspirating smoke detection unit may be arranged to use power from an external power source (received via the electrical connection point) to energise the controller, the smoke detector, the aspirator(s), the ozone generator and/or the ionizer.

The aspirating smoke detection unit may comprise one or more high voltage power supplies for powering (i.e. energising) the smoke detector, aspirator(s), ionizer and/or ozone generator. One or more high voltage power supply may comprise a direct current (DC) power source, such as a battery. The DC power source may be arranged to provide an input voltage of 3V to 15V, for instance 5V or 12V. The high voltage power supply may comprise a power convertor, such as a DC-to-DC converter, for stepping-up an input voltage provided to the ionizer and/or ozone generator.

One or more high voltage power supply may comprise an input power connector for receiving electrical current from an alternating current power source, such as a mains outlet. Each high voltage power supply may include a rectifier for converting the AC input to DC. The rectifier may be arranged between the input power connector and the smoke detector, aspirator(s), ionizer and/or the ozone generator such that the DC power can be supplied to the smoke detector, aspirator(s), ionizer and/or the ozone generator. One or more high voltage power supply may include a transformer or a voltage multiplier for stepping-up the input voltage. Hence the aspiration smoke detector, aspirator(s), ionizer and the ozone generator may be powered by a DC power supply (e.g. a battery) and/or an AC power supply (e.g. mains outlet).

The aspirating smoke detection unit may be comprise a single high voltage power supply for powering one or more or all of the smoke detector, aspirator(s), ionizer and the ozone generator. Alternatively, the aspirating smoke detection unit may comprise a plurality of high voltage power supplies, each high voltage power supply being arranged to power one of the smoke detector, aspirator(s), ionizer and the ozone generator.

In a second aspect, the present invention may provide an aspiration smoke detection system for limiting the spread of airborne contaminants within a monitored region, the system comprising: an aspirating smoke detection unit of the above described first aspect; one or more sampling pipes having one or more sampling inlets for admitting air from monitored region, wherein the one or more sampling pipes are fluidly connected to the aspirating smoke detection unit for transporting air from monitored region to the aspirating smoke detection unit; and one or more exhaust pipes fluidly connected to the aspirating smoke detection unit for passing air expelled from the unit to the monitored region.

In this way, air can be passed to the smoke detection unit from the monitored region via the sampling pipe(s) for removal and/or neutralisation of contaminants suspended in the air by the ozone and/or ions produced in the aspirating smoke detection unit. Purified air can then be passed back into the monitored region via the exhaust pipe(s).

Preferably, the aspirating smoke detection unit is configured such that ions produced by the ionizer are expelled from the aspirating smoke detection system via the exhaust pipe(s). In this way, ions produced by the ioniser can be passed into the monitored region for removing built-up charge on surfaces within the monitored region.

The aspirating smoke detection unit of the second aspect may include any one or more or all of the features discussed above in respect of the first aspect.

The aspirating smoke detection unit may be remote from the monitored region. For instance, the aspirating smoke detection unit may be located outside of the monitored region.

The monitored region may comprise a building, for instance a hospital, and/or one or more rooms within a building. The monitored region may include a clean room and/or one or more rooms within an electronics manufacturing plant.

In a third aspect, the present invention may provide a method of reducing the spread of airborne contaminants within a monitored region using an aspirating smoke detection unit, the method comprising: providing an aspiration smoke detection unit, wherein the aspiration smoke detection unit comprises an ozone generator for producing ozone from oxygen contained in air; passing air from the monitored region to the aspirating smoke detection unit; using the ozone generator to produce ozone from oxygen within the air from the monitored region, wherein the produced ozone acts to kill and/or neutralise pathogens within the air and provide purified air; and passing the purified air into the monitored region.

The aspirating smoke detection unit may include any one or more or all of the features discussed above in respect of the first aspect. For instance, the aspirating smoke detection unit may comprise a smoke detector for detecting the presence of smoke particles suspended in air and/or an ionizer for ionizing air molecules. Hence, the third aspect may be considered to provide a method of reducing the spread of airborne contaminants within a monitored region using an aspirating smoke detection unit of the above described first aspect, the method comprising: passing air from the monitored region to the aspirating smoke detection unit; using the ozone generator to produce ozone from oxygen within the air from the monitored region, wherein the produced ozone acts to kill and/or neutralise pathogens within the air and provide purified air; and passing the purified air into the monitored region.

Pathogens suspended in the air that is passed to the aspirating smoke detection unit may be neutralised and/or killed through interaction with the ozone produced by the ozone generator. As such, the air passed back into the monitored region (i.e. the purified air) may be sterilised and the spread disease caused by these pathogens can be curtailed. This can be achieved by making use of an aspirating smoke detection unit which may be arranged to move air within the monitored region in order to monitor the air for the presence of smoke particles.

The method may also comprise using the ionizer to ionize air molecules passed to the aspirating smoke detector from the monitored region. The produced ions (i.e. charged air molecules) may be attracted to contaminants suspended in the air, giving the contaminants a net electric charge. This may cause the contaminants to be attracted to grounded conductors, e.g. in the aspirating smoke detection unit or in the monitored region, removing the contaminants from the air. This may help to purify the air in the monitored region.

The method may comprise using the aspirator(s) to draw air into the aspirating smoke detection unit and move air through the unit. Action of the aspirator(s) may cause air to be passed from the aspirating smoke detection unit into monitored region.

The ozone generator may be used to produce ozone only when the aspirator is operated to pass air to the aspirating smoke detection unit. That is, the ozone generator may be used to produce ozone only when air is being passed to the aspirating smoke detection system (and hence the ozone generator) through action of the aspirator.

Using the ozone generator may comprise intermittently using the ozone generator. Hence, ozone may be produced intermittently. The ozone generator may be (continuously)

operated for periods of 5 minutes or more, or 10 minutes or more. These periods of operation may be separated by intervals in which the ozone generator is not used to produce ozone. These intervals may be intervals of at least 30 seconds, or at least 1 minute.

The method may also comprise passing ions generated by the ionizer into the monitored region. The ions may be attracted to charged surfaces in the monitored region, helping to reduce or remove charge built-up on the surfaces. This may help to reduce contamination of the surfaces and objects within the monitored region via electrostatic attraction and, as discussed above, can provide a means of controlling electrostatic discharge. This may be seen as an invention in its own right. Hence, in a fourth aspect, the present invention may provide a method of reducing the spread of airborne contaminants within a monitored region using an aspirating smoke detection unit, the method comprising: providing an aspiration smoke detection unit, wherein the aspiration smoke detection unit comprises an ionizer for ionizing air molecules; passing air from a monitored region to the aspirating smoke detection unit; using the ionizer to ionize air molecules within the air from the monitored region to produce ionized air; and passing the ionized air into the monitored region for reducing and/or neutralising electric charge on surfaces in the monitored region.

The aspirating smoke detection unit may include any one or more or all of the features discussed above in respect of the first aspect. For instance, the aspirating smoke detection unit may comprise a smoke detector for detecting the presence of smoke particles suspended in air and/or an ozone generator for producing ozone from oxygen contained in air. Hence, the fourth aspect may be considered to provide a method of reducing the spread of airborne contaminants within a monitored region using an aspirating smoke detection unit of the above described first aspect, the method comprising: passing air from a monitored region to the aspirating smoke detection unit; using the ionizer to ionize air molecules within the air from the monitored region to produce ionized air; and passing the ionized air into the monitored region for reducing and/or neutralising electric charge on surfaces in the monitored region.

Since the ions will be attracted to the charged surfaces through electrostatic attraction, there may not be a need to actively direct the air from the aspirating smoked detection unit (including the ions contained in the air) at or to the charged surfaces. That is, passing air into the monitored region may be sufficient for the ions to be attracted to charged surfaces within the monitored region.

The aspiration smoke detection unit of the third or fourth aspect may include one, or more or all of the above described optional features.

The following description may be applicable to the methods of the third and fourth aspects.

The method(s) may comprise using an aspirator to pass the air from the region of interest to the aspirating smoke detection unit. The aspirator may be used to pass the air from the aspirating smoke detection unit back into the monitored region.

The ionizer may be used to ionize air molecules only when the aspirator is operated to pass air to the aspirating smoke detection unit. That is, the ionizer may be used to ionize air molecules only when air is being passed to the aspirating smoke detection system (and hence the ionizer) through action of the aspirator.

Using the ionizer may comprise intermittently using the ionizer. The ionizer may be (continuously) operated for periods of 5 minutes or more, or 10 minutes or more. These periods of operation may be separated by intervals in which the ionizer is not used to ionize air molecules. These intervals may be intervals of at least 30 seconds, or at least 1 minute.

The method(s) may comprise using the smoke detector to detect the presence of smoke particles suspended in the air. This may include passing air from the monitored region to the smoke detector for detecting the presence of and/or determining the concentration of smoke particles in the air. Air may be passed to the smoke detector before and/or after it is passed to the ionizer and/or ozone generator. The method(s) may comprise triggering an alarm and/or alert if the concentration of smoke particles suspended in the air measured by the smoke detector is above a predetermined threshold value.

The monitored region may comprise a building, for instance a hospital, and/or one or more rooms within a building. The monitored region may include a clean room and/or one or more rooms within an electronics manufacturing plant.

BRIEF DESCRIPTION OF THE DRAWINGS

Certain embodiments of the present invention will now be described, by way of example only, with reference to the accompanying drawings, in which.

DETAILED DESCRIPTION OF THE INVENTION

Figure 1:
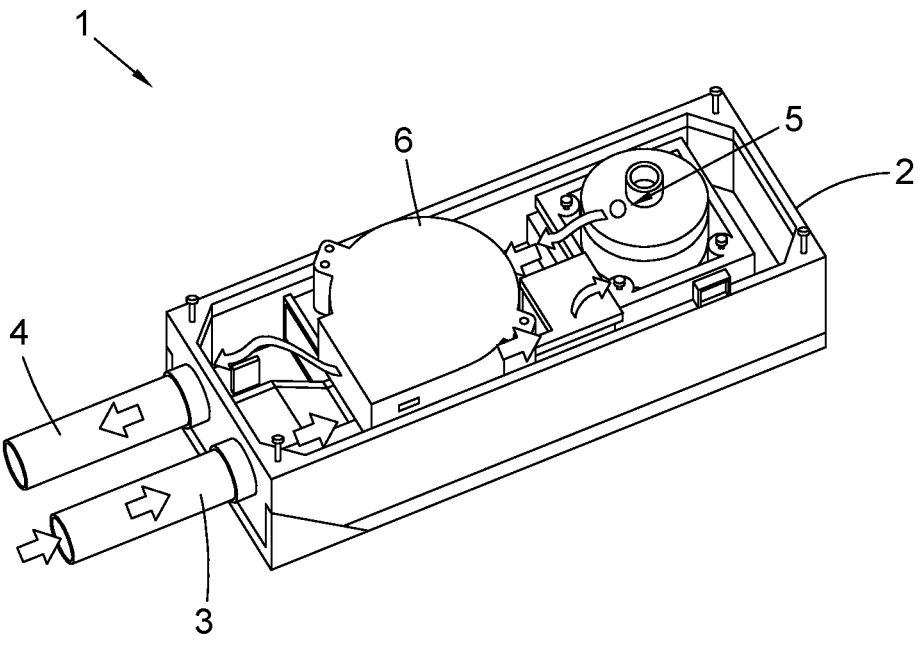
FIG. 1 shows a perspective view of an aspirating smoke detector unit for use in an aspirating smoke detection system.
Figure 2:
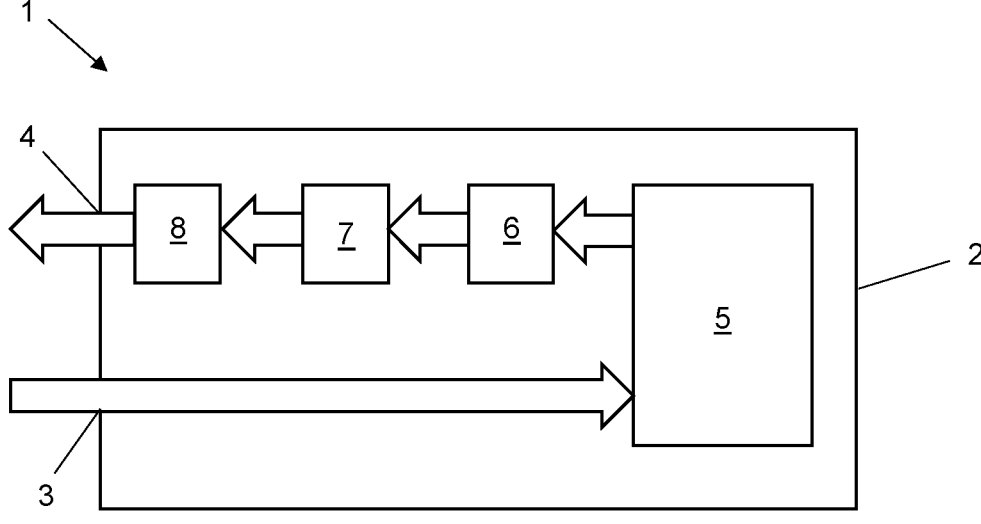
FIG. 2 is a schematic illustration of the aspirating smoke detector unit of FIG. 1.

FIGS. 1 and 2 show an aspirating smoke detection unit 1 for use in an aspirating smoke detection system 10. The aspirating smoke detection unit 1 comprises a housing 2 having an inlet 3 through which air (including smoke particles and contaminants, when present) can enter the housing 2, and an outlet 4 fluidly connected to the inlet 3 to allow air to be exhausted from the unit 1. An air flow path is defined within the housing 2 between the inlet and the outlet, and air may traverse the aspirating smoke detection unit 1 via the air flow path. The air flow path is shown by the arrows in FIG. 1.

A smoke detector 5 is arranged in the air flow path downstream of the inlet 3 for detecting the presence of smoke particles suspended in the air. Air drawn into the aspirating smoke detection unit 1 through the inlet 3 is received by the smoke detector 5. In the aspirating smoke detection unit 1 shown in FIG. 1, the smoke detector 5 is an optical smoke detector, such as a laser detection system, although any known smoke detector may be used.

A fan 6 is located downstream of the smoke detector 5 and is fluidly connected to the smoke detector 5 for receiving air output from the smoke detector 5. The fan 6 is arranged to, in use, draw air into the smoke detection unit 1 via the inlet 3 and pass the air though the smoke detection unit 1, via the air flow path, to the outlet 4.

Whilst in the aspirating smoke detection unit shown in FIGS. 1 and 2 the fan 6 is positioned downstream of the smoke detector 5, the aspiration smoke detection unit 1 may alternatively or additionally include a fan located upstream of the smoke detector 5. In this way, the smoke detector 5 may receive air after the air has passed over a fan upstream of the smoke detector 5.

As shown in FIG. 2, the aspirating smoke detection unit 1 includes an ozone generator 7 for producing ozone from oxygen contained in the air. The ozone generator 7 is positioned downstream of the fan 6 and is fluidly connected to the fan 6 to receive air from the fan 6. The ozone generator 7 is arranged to use air passing though the aspirating smoke detection unit 1 as a source of oxygen molecules (i.e. $O_2$) and to break these down in order to form ozone (i.e. $O_3$). In use, when air is passed through the ozone generator 7, oxygen within the air is broken down into single oxygen atoms which then react with other oxygen molecules to form ozone. Hence, the ozone generator provides the aspirating smoke detection unit 1 with the capability to generate ozone from the air passing through the aspirating smoke detection unit 1.

The ozone generator 7 may comprise a corona discharge reactor cell, or any other suitable ozone generator, such a UV ozone generator. A corona discharge reactor cell commonly includes a pair of electrodes and dielectric plates arranged in a spaced relationship between the electrodes such that an air gap is formed between the electrodes and the dielectric plates. In operation, a potential difference is applied across the electrodes to form high energy electric field, or a corona, between the electrodes. Ozone is created when air containing oxygen moves through the corona.

The aspirating smoke detection unit 1 also includes an air ionizer 8 for ionizing (i.e. providing a net electrical charge to) air molecules. In the aspirating smoke detection unit shown in FIG. 2, the air ionizer 8 is positioned downstream of the ozone generator 7 and is fluidly connected to the ozone generator 7 to receive air output from the ozone generator 7. The air ionizer 8 is arranged to use high voltage to ionize air molecules, causing the air molecules to become negatively charged. The air ionizer 8 may include one or more a discharge needles to which a high voltage can be applied in order to create an electric field around the discharge needle.

The air ionizer 8 and the ozone generator 7 are obscured from view in FIG. 1 by the fan.

The aspirating smoke detection unit 1 may comprise a high voltage power supply unit (not shown) for energising the ionizer 8 and the ozone generator 7. The high voltage power supply unit may comprise a DC power source, such as a battery, for powering the air ionizer 8 and the ozone generator 7.

The aspirating smoke detection unit 1 also includes a controller (not shown) for controlling operation of the smoke detection unit 1 and/or for processing data from the unit 1. The controller is arranged to receive data from the smoke detector 5 for further processing, and may be configured to raise an alarm and/or an alert if data from the smoke detector 5 indicates that the concentration of smoke particles in the air is above a predetermined threshold indicative of the presence of a fire.

The controller is also arranged to control operation of the smoke detector 5, fan 6, ozone generator 7 and the air ionizer 8. For instance, the controller may provide for selective operation of the smoke detector 5, fan 6, ozone generator 7 and air ionizer 8 such that each of these components can be operated independently from one another by providing control over a supply of electrical power to each of the smoke detector 5, the fan 6, the ozone generator 7 and/or the air ionizer 8.

Figure 3:
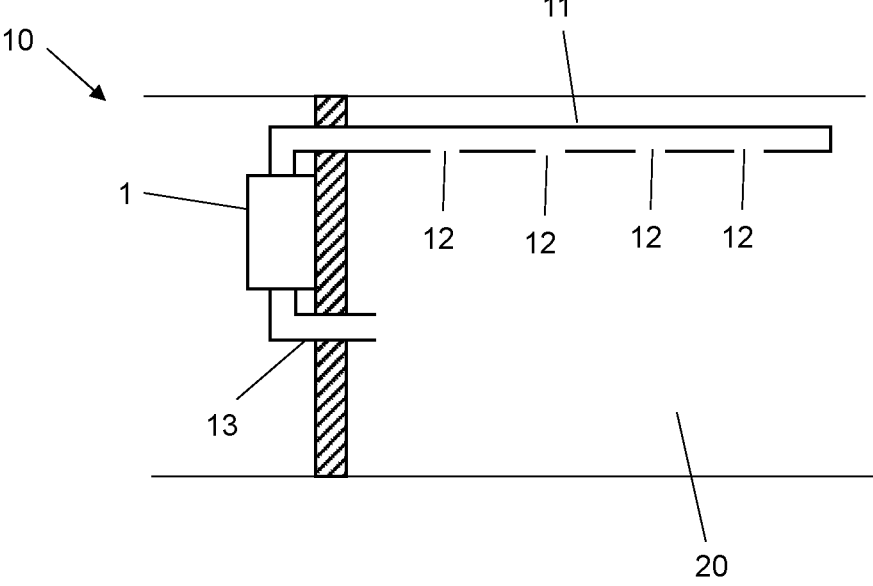
FIG. 3 shows a schematic of an aspirating smoke detection system.

FIG. 3 shows an aspirating smoke detection system 10 comprising the aspirating smoke detection unit 1 described above. In the aspirating smoke detection system 10 of FIG. 3, the inlet 3 of the aspirating smoke detection unit 1 is fluidly connected to a sampling pipe 11 that extends into a monitored region 20 (e.g. one or more rooms in a building). The sampling pipe 11 includes a plurality of sampling inlets 12 through which air can pass from the monitored region 20 into the sampling pipe. Hence, air from the monitored region 20 can be passed to the aspirating smoke detection unit 1 via the sampling pipe 11. The outlet 4 of the aspirating smoke detection unit 1 is fluidly connected to an exhaust pipe 13 which extends into the monitored region 20 such that air can be passed back into the monitored region 20 after being passed though the aspiration smoke detection unit 1. Ions produced in the aspirating smoke detection unit 1 through operation of the air ionizer 8, can also be passed into the monitored region 20 via the exhaust pipe 13.

The operation of the aspirating smoke detection unit 1 will now be described with reference to FIGS. 1-3.

When the fan 6 is energised, the action of the fan 6 causes air to be drawn into the aspirating smoke detection unit 1 through the inlet 3. Smoke particles and other contaminants, such as dust, pollen, bacteria and viruses, may be suspended in the air that is drawn into the aspirating smoke detection unit 1. Accordingly, the smoke particles and contaminants are caused to be drawn into the aspirating smoke detection unit 1 together with the air by the action of the fan.

If the aspirating smoke detection unit 1 is arranged in situ in an aspirating smoke detection system 10, as shown in FIG. 3, the action of the fan 6 causes air (and contaminants suspended in the air) to be drawn into the system 10 from the monitored region 20 through the sampling inlets 12 in the sampling pipe 11. The air (and any contaminants suspended in the air) is then drawn along the sampling pipe 11 and into the aspirating smoke detection unit 1 through the inlet 3.

Air entering the aspirating smoke detection unit 1 via the inlet 3 is passed to the smoke detector 5, which is used to determine the concentration of smoke particles suspended in the air. The smoke detector 5 constantly monitors the air and acquires information about the concentration of smoke particles present. This smoke concentration data is passed to the controller for further processing. If the smoke concentration data indicates that the concentration of smoke particles in the sampled air is above a predefined threshold limit, the controller determines that a fire is present in the monitored region 20 and may trigger an alarm and/or an alert.

The operation of the fan 6 acts to draw air from the smoke detector 5 and push it towards the ozone generator 7, such that the air output from the smoke detector 5 is received by the ozone generator 7. When energised, the ozone generator 7 produces ozone from the oxygen molecules in the air such that the air output from the ozone generator 7 includes molecules of ozone. The controller may be used to adjust the power supplied to the ozone generator 7 in order to adjust the concentration of ozone in the air output from the ozone generator 7.

The ozone produced by the ozone generator 7 may kill or neutralise pathogens entrained in the air. When the ozone produced by the ozone generator 7 comes into contact with a cellular pathogen, such as bacteria, it reacts with the cellular membrane of the pathogen, killing the cellular pathogen. The ozone may also be used to neutralise acellular pathogens, such as viruses. When the ozone produced by the ozone generator 7 comes into contact with a virus, the ozone reacts with the virus' protein coat and prevents the virus from being able to anchor itself to host cells. This neutralises the virus' ability to infect host cells.

Ozone has also been found to eliminate odours from air. As such the ozone produced by the ozone generator 7 may enhance the smell of the air flowing through the aspirating smoke detection unit 1, and remove foul and/or stale odours.

The air output from the ozone generator 7 is received by the air ionizer 8 which, when energised, generates negatively charged ions in the air. The air, including the negatively charged ions, is expelled from the aspirating smoke detection unit through the outlet 4. When the outlet is connected to an exhaust pipe 13 of an aspirating smoke detection system 10, as shown in FIG. 3, the air and the negatively charged ions are passed back into the monitored region 20 via the exhaust pipe 13. As such, the air exhausted from the aspirating smoke detection system 10 and into the monitored region includes negatively charged ions.

The negative ions in the exhaust air can act to reduce or eliminate the build-up of static charge on insulators and isolated (i.e. non-grounded) conductors within the monitored region 20. Negative ions expelled from the aspirating smoke detection system will be attracted to positively charged surfaces in the monitored region 20. This positive charge may be a static charge that has built up on the surface of an object, for example through an exchange of electrons between the surface of the object and air particles flowing over the surface of the object. When the negative ions produced by the air ionizer 8 contact a positively charged surface, the charge (e.g. static charge) built-up on the surface will be reduced or removed. Accordingly, the ions generated by the air ionizer 8 can be used to neutralise charge built-up on the surface of objects in the monitored region 20.

Charged surfaces may attract contaminants suspended in the air through electrostatic attraction. This type of contamination can be reduced or avoided by neutralising the charge on the surface of an object, as described above. Hence, by emitting ions that can neutralise the charge on objects in the monitored region 20, the aspirating smoke detection unit 1 can be used to reduce or avoid contamination caused by electrostatic attraction.

The negative ions produced by the air ionizer 8 may also be attracted to contaminant particles (e.g. dust and pollen) and pathogens suspended in the air, giving the particles and pathogens an overall negative charge. These negatively charged particles and pathogens may then be attracted to grounded conductors, either in the aspirating smoke detection system 10 or in the monitored region 20, removing the particles and pathogens from the air. Hence, the spread of the contaminant particles and pathogens through movement of the air can curtailed.

Contaminant particles suspended within air are also known to cause foul odours and stale smells. Hence, by removing these contaminants from the air the aspirating smoke detection unit 1 can be used to reduce or remove such odours from the air exhausted back into the monitored region.

What is claimed is:

1. An aspirating smoke detection unit (1) for limiting the spread of airborne contaminants, comprising:
   a smoke detector (5) for detecting the presence of smoke particles suspended in air from a monitored region (20);
   an ozone generator (7) for producing ozone from oxygen contained in air from the monitored region; and
   an ionizer (8) for ionizing air molecules within air from the monitored region;
   wherein the ionizer is configured to generate an ion density of at least 600,000 ions/cm$^3$.

2. As aspirating smoke detection unit (1) according to claim 1, comprising one or more aspirators (6) for drawing air into the aspirating smoke detection unit and moving air through the unit, preferably wherein the one or more aspirators comprises one or more blowers and/or fans.

3. An aspirating smoke detection unit (1) according to claim 2, wherein the one or more aspirators (6) are configured to, in use, draw air into the aspirating smoke detection unit from the monitored region and pass the air between the smoke detector (5), ozone generator (7) and the ionizer (8).

4. An aspirating smoke detection unit (1) according to claim 1, wherein the ionizer (8) and/or the ozone generator (7) are positioned downstream of the smoke detector (5).

5. An aspirating smoke detection unit (1) according to claim 1, wherein the ionizer (8) is configured to generate negative ions.

6. An aspirating smoke detection unit (1) according to claim 1, wherein the ionizer (8) is configured to generate an ion density of $20 \times 10^6$ ions/cm$^3$.

7. An aspirating smoke detection unit according to claim 1, wherein the ozone generator (7) comprises a corona discharge reactor cell.

8. An aspirating smoke detection unit (1) according to claim 1, wherein the smoke detector (5) comprises an optical smoke detector.

9. An aspirating smoke detection unit (1) according to claim 1, comprising a controller, wherein the controller is arranged to control operation of the smoke detector (5), the aspirator(s) (6), the ozone generator (7) and/or the ionizer (8).

10. An aspirating smoke detection unit (1) according to claim 9, wherein the controller is configured to operate the ozone generator (7) and/or the ionizer (8) only when one or more of the aspirators (6) is in operation.

11. An aspiration smoke detection system (10) for limiting the spread of airborne contaminants within a monitored region (20), the system comprising:
   an aspirating smoke detection unit (1) according to claim 1;
   one or more sampling pipes (11) having one or more sampling inlets (12) for admitting air from the monitored region, wherein the one or more sampling pipes are fluidly connected to the aspirating smoke detection unit for transporting air from the monitored region to the aspirating smoke detection unit; and
one or more exhaust pipes (13) fluidly connected to the aspirating smoke detection unit for passing air expelled from the unit to the monitored region.

12. A method of reducing the spread of airborne contaminants within a monitored region (20) using an aspirating smoke detection unit (1), the method comprising:
   providing an aspiration smoke detection unit, wherein the aspiration smoke detection unit comprises an ozone generator (7) for producing ozone from oxygen contained in air, and an ionizer (8) for ionizing air molecules;
   passing air from the monitored region to the aspirating smoke detection unit;
   using the ozone generator to produce ozone from oxygen within the air from the monitored region, wherein the produced ozone acts to kill and/or neutralise pathogens within the air and provide purified air;
   using the ionizer to ionize air molecules passed to the aspirating smoke detector from the monitored region;
   passing the purified air into the monitored region; and
   passing ions generated by the ionizer into the monitored region for reducing and/or neutralising electric charge on surfaces in the monitored region.

13. A method of reducing the spread of airborne contaminants within a monitored region (20) using an aspirating smoke detection unit (1), the method comprising:
   providing an aspiration smoke detection unit, wherein the aspiration smoke detection unit comprises an ionizer (8) for ionizing air molecules;
   passing air from a monitored region to the aspirating smoke detection unit;
   using the ionizer (8) to ionize air molecules within the air from the monitored region to produce ionized air; and
   passing the ionized air into the monitored region for reducing and/or neutralising electric charge on surfaces in the monitored region.

* * * * *